(12) United States Patent
Kakura (10) Patent No.: US 12,309,812 B2
(45) Date of Patent: May 20, 2025

(54) RADIO COMMUNICATION APPARATUS, METHOD, PROGRAM, AND RECORDING MEDIUM

(71) Applicant: NEC CORPORATION, Tokyo (JP)

(72) Inventor: Yoshikazu Kakura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 158 days.

(21) Appl. No.: 16/762,799

(22) PCT Filed: Sep. 12, 2018

(86) PCT No.: PCT/JP2018/033852
§ 371 (c)(1),
(2) Date: May 8, 2020

(87) PCT Pub. No.: WO2019/097828
PCT Pub. Date: May 23, 2019

(65) Prior Publication Data
US 2021/0195575 A1     Jun. 24, 2021

(30) Foreign Application Priority Data
Nov. 14, 2017    (JP) ................................. 2017-218768

(51) Int. Cl.
*H04W 72/51*      (2023.01)
*H04W 72/0453*    (2023.01)

(52) U.S. Cl.
CPC ........ *H04W 72/51* (2023.01); *H04W 72/0453* (2013.01)

(58) Field of Classification Search
None
See application file for complete search history.

(56) References Cited

U.S. PATENT DOCUMENTS

| 11,451,436 B2 * | 9/2022 | Yi ..................... H04L 27/26025 |
| 2012/0094706 A1 | 4/2012 | Fukumoto et al. |

(Continued)

FOREIGN PATENT DOCUMENTS

| JP | 2015-149566 A | 8/2015 |
| JP | 2017-050633 A | 3/2017 |

(Continued)

OTHER PUBLICATIONS

Translation of Written Opinion of the International Searching Authority dated Nov. 6, 2018, in International Application No. PCT/JP2018/033852.

(Continued)

*Primary Examiner* — Jeffrey M Rutkowski
*Assistant Examiner* — Ning Li
(74) *Attorney, Agent, or Firm* — Sughrue Mion, PLLC (57) ABSTRACT

In order to flexibly determine a communication band in consideration of a bandwidth part configured for a terminal apparatus, a base station 100 of the present invention includes an obtaining unit 143 configured to obtain information related to a maximum communication bandwidth for a terminal apparatus 200 and information related to one or more bandwidth parts configured for the terminal apparatus 200, and a determining unit 145 configured to determine a communication band used by the terminal apparatus 200, based on the information related to the maximum communication bandwidth for the terminal apparatus 200 and the information related to the one or more bandwidth parts configured for the terminal apparatus 200.

8 Claims, 6 Drawing Sheets

(56) References Cited

U.S. PATENT DOCUMENTS

| | | | |
|---|---|---|---|
| 2016/0044606 A1* | 2/2016 | Yin | H04W 52/346 455/450 |
| 2018/0279310 A1* | 9/2018 | Chen | H04W 72/0453 |
| 2018/0338339 A1* | 11/2018 | Song | H04L 5/001 |
| 2018/0368112 A1* | 12/2018 | Sebeni | H04W 52/0209 |
| 2019/0045491 A1* | 2/2019 | Zhang | H04L 5/0098 |
| 2019/0132793 A1* | 5/2019 | Lin | H04W 52/0274 |
| 2019/0132862 A1* | 5/2019 | Jeon | H04L 5/0098 |
| 2019/0141546 A1* | 5/2019 | Zhou | H04B 7/0626 |
| 2019/0141647 A1* | 5/2019 | Nimbalker | H04W 4/40 |
| 2019/0342782 A1* | 11/2019 | Yum | H04W 72/0413 |
| 2019/0373667 A1* | 12/2019 | Jeon | H04L 5/0091 |
| 2020/0077432 A1* | 3/2020 | Xiong | H04L 5/0092 |
| 2020/0112976 A1* | 4/2020 | Lin | H04W 72/535 |
| 2020/0252905 A1* | 8/2020 | Tang | H04L 5/0053 |
| 2020/0288494 A1* | 9/2020 | Heo | H04W 72/20 |
| 2020/0374866 A1* | 11/2020 | Takeda | H04L 5/0053 |
| 2021/0075581 A1* | 3/2021 | Takeda | H04L 5/0094 |
| 2021/0091913 A1* | 3/2021 | Shen | H04L 5/0098 |
| 2021/0337444 A1* | 10/2021 | Tang | H04L 5/0064 |

FOREIGN PATENT DOCUMENTS

| | | |
|---|---|---|
| WO | 2010/016596 A1 | 2/2010 |
| WO | 2010/137259 A1 | 12/2010 |

OTHER PUBLICATIONS

Japanese Office Action for JP Application No. 2019-553712 mailed on Aug. 17, 2021 with English Translation.
LG Electronics, "Remaining issues on bandwidth parts", 3GPP TSG RAN WG1 #90bis, R1-1717972, Czech Republic, Oct. 3, 2017.
"Resource allocation for data channel in NR", ASUSTek, 3GPP TSG RAN WG1 AH_NR Meeting, R1-1701043, Jan. 16-20, 2017, Spokane, USA, 3 pages.
"NR wider bandwidth operation up to 1GHz", CATT, 3GPP TSG RAN WG1 Meeting #89, R1-1707527, May 15-19, 2017, Hangzhou, China, 5 pages.
"Resource allocation and indication for data channel", Huawei, HiSilicon, 3GPP TSG RAN WG1 Meeting #88bis, R1-1705069, Apr. 3-7, 2017, Spokane, USA, 9 pages.
"Further Details on Bandwidth Part Operation in NR", MediaTek Inc., 3GPP TSG RAN WG1 Meeting #90, R1-17013978, Aug. 21-25, 2017, Prague Czech Republic, 11 pages.
"RRM Measurement for Bandwidth Part Operation", MediaTek Inc., 3GPP TSG RAN WG2 Meeting #99, R2-1708001, Aug. 21-25, 2017, Berlin, Germany, 6 pages.
International Search Report for PCT/JP2018/033852, dated Nov. 6, 2018.
Written Opinion for PCT/JP2018/033852, dated Nov. 6, 2018.
"LS on UE RF Bandwidth Adaptation in NR", 3GPP TSG-RAN WG1 Meeting #87, R1-1613663, Nov. 14-18, 2016, Reno, USA, 1 page.
"3rd Generation Partnership Project; Technical Specification Group Radio Access Network; NR; Physical channels and modulation (Release 15)", 3GPP TS 38.211 V1.0.0, Sep. 2017, 37 pages.
"Two-step resource allocation for data channel in NR", ASUSTek, 3GPP TSG RAN WG1 NR Ad-hoc#2, R1-1711363, Jun. 27-30, 2017, Qingdao, P.R. China, 3 pages.
"Two-step resource allocation for data channel in NR", ASUSTek, 3GPP TSG RAN WG1 Meeting #89, R1-1709049, May 15-19, 2017, Hangzhou, P.R. China, 3 pages.
"Resource allocation for data channel in NR", ASUSTek, 3GPP TSG RAN WG1 Meeting #88, R1-1703055, Feb. 13-17, 2017, Athens, Greece, 3 pages.
"Further Details on Bandwidth Part Operation in NR", MediaTek Inc., 3GPP Tsg Ran WG1 Meeting #90, R1-1713978, Aug. 21-25, 2017, Prague Czech Republic, 11 pages.

* cited by examiner

RADIO COMMUNICATION APPARATUS, METHOD, PROGRAM, AND RECORDING MEDIUM

CROSS REFERENCE TO RELATED APPLICATIONS

This application is a National Stage of International Application No. PCT/JP2018/033852 filed Sep. 12, 2018, claiming priority based on Japanese Patent Application No. 2017-218768 filed Nov. 14, 2017, the entire disclosure of which is incorporated herein.

BACKGROUND

Technical Field

The present invention relates to a radio communication apparatus, a method, a program, and a recording medium.

Background Art

Currently, in 3rd Generation Partnership Project (3GPP), standardization of New Radio (NR), which supports even wider frequency band than that supported by Long Term Evolution (LTE), is in progress.

For LTE, specifications have been drafted on the assumption that all terminal apparatuses have the capability of performing transmission/reception in a bandwidth of 20 MHz, which is the maximum system bandwidth. In contrast, for NR, it is agreed to define a different maximum communication bandwidth for each user type, by taking account of the possibility of the maximum system bandwidth ranging several hundred MHz to several GHz otherwise (refer to, for example, NPL 1).

When a different maximum communication bandwidth is defined for each user type as described above, transmission/reception in the entire system band is not possible for some user types in some cases. To address this, specifications have been drafted in 3GPP that a bandwidth part (BWP) consisting of frequency resources of a system band, is allocated to each user for communication (refer to, for example, NPL 2). A plurality of bandwidth parts may be allocated to each user. Each allocated bandwidth part is switched to active or inactive according to a control signal from a base station.

PTL 1, 2, 3, and 4 include disclosures related to a technique for determining resources, such as carriers or the number of carriers allocated for each user, in a technique such as carrier aggregation for aggregating a plurality of carriers, for example.

CITATION LIST

Patent Literature

[PTL 1] JP 2017-050633 A
[PTL 2] JP 2015-149566 A
[PTL 3] WO 2010/137259
[PTL 4] WO 2010/016596

Non Patent Literature

[NPL 1] 3GPP R1-1613663 RAN WG1, "LS on UE RF Bandwidth Adaptation in NR," November 2016.

[NPL 2] 3GPP TS 38.211 V1.0.0, "3rd Generation Partnership Project; Technical Specification Group Radio Access Network; NR; Physical channels and modulation (Release 15)", September 2017.

SUMMARY

Technical Problem

In technologies such as LTE, the center of a communication band used by a terminal apparatus is fixed at the center frequency of a system band or a component carrier, or the like, for example. In contrast, in communication systems, such as NR described above, that use bandwidth parts, it is desired to be able to flexibly determine a communication band in consideration of a bandwidth part(s) configured for each terminal apparatus within a system band.

An example object of the present invention is to provide a radio communication apparatus, a method, a program, and a recording medium that make it possible to flexibly determine a communication band in consideration of a bandwidth part(s) configured for a terminal apparatus.

Solution to Problem

According to an example aspect of the present invention, a radio communication apparatus includes an obtaining unit configured to obtain information related to a maximum communication bandwidth for a terminal apparatus and information related to one or more bandwidth parts configured for the terminal apparatus, and a determining unit configured to determine a communication band used by the terminal apparatus, based on the information related to the maximum communication bandwidth for the terminal apparatus and the information related to the one or more bandwidth parts configured for the terminal apparatus.

According to an example aspect of the present invention, a method includes obtaining information related to a maximum communication bandwidth for a terminal apparatus and information related to one or more bandwidth parts configured for the terminal apparatus, and determining a communication band used by the terminal apparatus, based on the information related to the maximum communication bandwidth for the terminal apparatus and the information related to the one or more bandwidth parts configured for the terminal apparatus.

According to an example aspect of the present invention, a program is a program that causes a processor to obtain information related to a maximum communication bandwidth for a terminal apparatus and information related to one or more bandwidth parts configured for the terminal apparatus, and determine a communication band used by the terminal apparatus, based on the information related to the maximum communication bandwidth for the terminal apparatus and the information related to the one or more bandwidth parts configured for the terminal apparatus.

According to an example aspect of the present invention, a recording medium is a readable non-transitory recording medium having recorded thereon a program that causes a processor to obtain information related to a maximum communication bandwidth for a terminal apparatus and information related to one or more bandwidth parts configured for the terminal apparatus, and determine a communication band used by the terminal apparatus, based on the information related to the maximum communication bandwidth for the terminal apparatus and the information related to the one or more bandwidth parts configured for the terminal apparatus.

Advantageous Effects of Invention

According to the present invention, it is possible to flexibly determine a communication band in consideration of a bandwidth part(s) configured for a terminal apparatus. Note that, according to the present invention, instead of or together with the above effect, other effects may be exerted.

DESCRIPTION OF THE EXAMPLE EMBODIMENTS

Hereinafter, example embodiments of the present invention will be described in detail with reference to the accompanying drawings. Note that, in the Specification and drawings, elements to which similar descriptions are applicable are denoted by the same reference signs, and overlapping descriptions may hence be omitted.

Descriptions will be given in the following order.
1. Overview of Example Embodiments of the Present Invention
2. Configuration of System
3. First Example Embodiment
　3.1. Configuration of Base Station
　3.2. Configuration of Terminal Apparatus
　3.3. Technical Features
　3.4. Example Alteration
4. Second Example Embodiment
　4.1. Configuration of Radio Communication Apparatus
　4.2. Technical Features
5. Other Example Aspects 1. Overview of Example Embodiments of the Present Invention First, an overview of example embodiments of the present invention will be described.
(1) Technical Issues
Currently, in 3rd Generation Partnership Project (3GPP), standardization of New Radio (NR), which supports even wider frequency band than that supported by Long Term Evolution (LTE), is in progress.

For LTE, specifications have been drafted on the assumption that all terminal apparatuses have the capability of performing transmission/reception in a bandwidth of 20 MHz, which is the maximum system bandwidth. In contrast, for NR, it is agreed to define a different maximum communication bandwidth for each user type, by taking account of the possibility of the maximum system bandwidth ranging several hundred MHz to several GHz otherwise (refer to, for example, Reference Literature 1 below).

Reference Literature 1: 3GPP R1-1613663 RAN WG1, "LS on UE RF Bandwidth Adaptation in NR," November 2016.

When a different maximum communication bandwidth is defined for each user type as described above, transmission/reception in the entire system band is not possible for some user types in some cases. To address this, specifications have been drafted in 3GPP that a bandwidth part (BWP) consisting of part of frequency resources of a system band, is allocated for each user, to perform communication in the bandwidth part (refer to, for example, Reference Literature 2 below). A plurality of bandwidth parts may be allocated to each user. The allocated bandwidth part(s) is switched to active or inactive according to a control signal from a base station.

Reference Literature 2: 3GPP TR 38.211 V1.0.0, "3rd Generation Partnership Project; Technical Specification Group Radio Access Network; NR; Physical channels and modulation (Release 15)", September 2017.

Reference Literature 3, 4, 5, and 6 below include disclosures related to a technique for determining resources, such as carriers and/or the number of carriers assigned for each user, in a technique such as carrier aggregation for aggregating a plurality of carriers, for example.

Reference Literature 3: JP 2017-050633 A
Reference Literature 4: JP 2015-149566 A
Reference Literature 5: WO 2010/137259
Reference Literature 6: WO 2010/016596

In technologies such as LTE, the center of a communication band used by a terminal apparatus is fixed at the center frequency of a system band or a component carrier, or the like, for example. In contrast, in communication systems, such as NR described above, that use bandwidth parts, it is desired to be able to flexibly determine a communication band in consideration of a bandwidth part(s) configured for each terminal apparatus within a system band. This is because, for example, if a communication band used by a terminal apparatus is determined without any consideration of a bandwidth part(s) configured for the terminal apparatus, switching of the communication band may occur frequently, for example, as in the following example.

Figure 1:
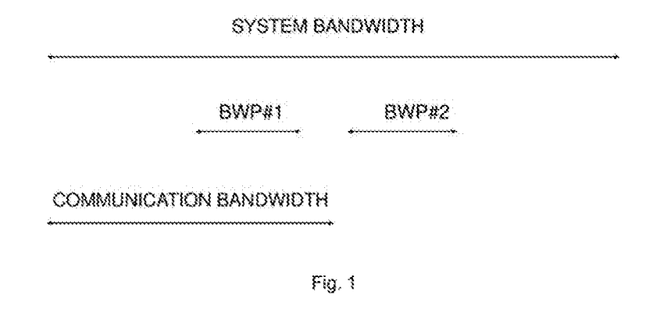
FIG. 1 is an explanatory diagram for illustrating a concrete example of bandwidth parts configured for a terminal apparatus and a communication band used by the terminal apparatus.

FIG. 1 is an explanatory diagram for illustrating a concrete example of bandwidth parts configured for a terminal apparatus and a communication band used by the terminal apparatus. As illustrated in FIG. 1, it is assumed that two bandwidth parts BWP #1 and BWP #2 are allocated to the terminal apparatus in a system band. It is also assumed that a communication band used by the terminal apparatus is determined to be a communication band including the bandwidth part BWP #1 but not including the bandwidth part BWP #2 as illustrated in FIG. 1, without any consideration of the bandwidth parts BWP #1 and BWP #2.

In the example illustrated in FIG. 1 described above, for example, when the bandwidth part BWP #2 is active, or when the bandwidth part BWP #2 is changed from inactive to active, the terminal apparatus needs to switch the communication band to include the bandwidth part BWP #2, in order to perform reception in the bandwidth part BWP #2. Such switching of the communication bands may cause a time lag in communication, an increase in power consumption by the terminal apparatus, and the like, for example.

In view of these, an example object of the example embodiments of the present invention is to flexibly determine a communication band in consideration of a bandwidth part(s) configured for a terminal apparatus.

(2) Technical Features

In the example embodiments of the present invention, for example, information related to a maximum communication bandwidth for a terminal apparatus and information related to one or more bandwidth parts configured for the terminal apparatus are obtained, and a communication band used by the terminal apparatus is determined based on the information related to the maximum communication bandwidth for the terminal apparatus and the information related to the one or more bandwidth parts configured for the terminal apparatus.

With this, it is possible, for example, to flexibly determine a communication band in consideration of a bandwidth part(s) configured for a terminal apparatus.

Note that the above-described technical features are concrete examples of the example embodiments of the present invention, and the example embodiments of the present invention are, of course, not limited to the above-described technical features.

2. Configuration of System

Figure 2:
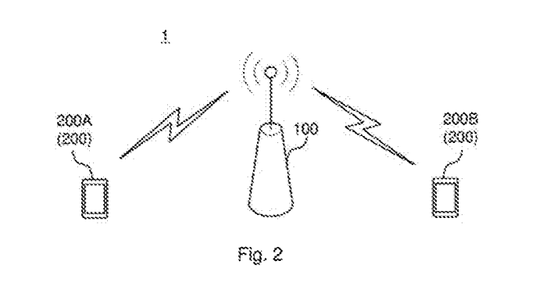
FIG. 2 is an explanatory diagram illustrating an example of a schematic configuration of a system 1 according to example embodiments of the present invention.

With reference to FIG. 2, an example of a configuration of a system 1 according to the example embodiments of the present invention will be described. FIG. 2 is an explanatory diagram illustrating an example of a schematic configuration of the system 1 according to the example embodiments of the present invention. With reference to FIG. 2, the system 1 includes a base station 100 and terminal apparatuses 200.

Although two terminal apparatuses 200 (a terminal apparatus 200A and a terminal apparatus 200B) are illustrated in FIG. 2, the system 1 may include three or more terminal apparatuses 200. Here, when the two terminal apparatuses 200 need to be distinguished from each other, the terminal apparatuses 200 are described as the terminal apparatus 200A and the terminal apparatus 200B. However, when the two terminal apparatuses 200 need not be distinguished from each other, the terminal apparatuses 200 are simply described as the terminal apparatus(es) 200.

The system 1 is, for example, a system conforming to Third Generation Partnership Project (3GPP) standards/specifications. More specifically, for example, the system 1 may be a system conforming to LTE/LTE-Advanced and/or System Architecture Evolution (SAE) standards/specifications. Alternatively, the system 1 may be a system conforming to fifth-generation (5G)/New Radio (NR) standards/specifications. The system 1 is, of course, not limited to these examples.

(1) Base Station 100

The base station 100 is a radio access network (RAN) node and is configured to perform radio communication with terminal apparatuses (e.g., the terminal apparatuses 200) located in a coverage area 10.

For example, the base station 100 may be an evolved Node B (eNB) or a generation Node B (gNB) in 5G. The base station 100 may include a plurality of units (or a plurality of nodes). The plurality of units (or the plurality of nodes) may include a first unit (or a first node) configured to perform higher protocol layer processing and a second unit (or a second node) configured to perform lower protocol layer processing. As an example, the first unit may be referred to as a center/central unit (CU), and the second unit may be referred to as a distributed unit (DU) or an access unit (AU). As another example, the first unit may be referred to as a digital unit (DU), and the second unit may be referred to as a radio unit (RU) or a remote unit (RU). The digital unit (DU) may be a base band unit (BBU), and the RU may be a remote radio head (RRH) or a remote radio unit (RRU). The terms for the first unit (or the first node) and the second unit (or the second node) are, of course, not limited to these examples. Alternatively, the base station 100 may be a single unit (or a single node). In this case, the base station 100 may be one of the plurality of units (e.g., either one of the first unit and the second unit) or may be connected to another unit of the plurality of units (e.g., the other one of the first unit and the second unit).

(2) Terminal Apparatus 200

Each terminal apparatus 200 performs radio communication with a base station. For example, the terminal apparatus 200 performs radio communication with the base station 100 in a case of being located in the coverage area 10 of the base station 100. For example, the terminal apparatus 200 is a user equipment (UE).

3. First Example Embodiment

Next, a description will be given of a first example embodiment of the present invention with reference to FIGS. 3 to 11.

<3.1. Configuration of Base Station>

Figure 3:
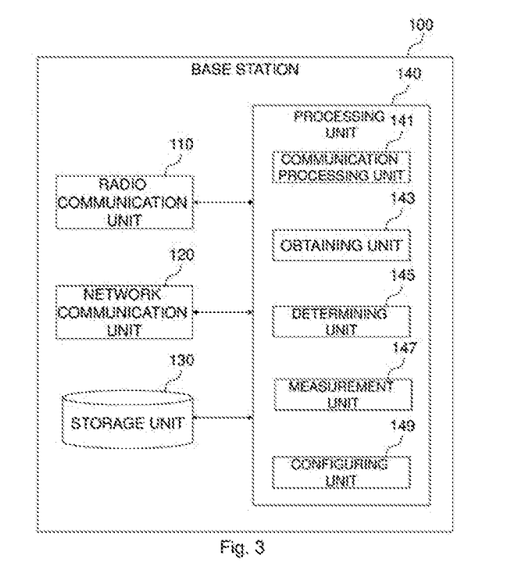
FIG. 3 is a block diagram illustrating an example of a schematic configuration of a base station 100 according to a first example embodiment.

Next, with reference to FIG. 3, a description will be given of an example of a configuration of the base station 100 according to the first example embodiment. FIG. 3 is a block diagram illustrating an example of a schematic configuration of the base station 100 according to the first example embodiment. With reference to FIG. 3, the base station 100 includes a radio communication unit 110, a network communication unit 120, a storage unit 130, and a processing unit 140.

(1) Radio Communication Unit 110

The radio communication unit 110 wirelessly transmits and/or receives a signal. For example, the radio communication unit 110 receives a signal from a terminal apparatus and transmits a signal to the terminal apparatus.

(2) Network Communication Unit 120

The network communication unit 120 receives a signal from a network and transmits a signal to the network.

(3) Storage Unit 130

The storage unit 130 temporarily or permanently stores programs (instructions) and parameters for operations of the base station 100 as well as various data. The program includes one or more instructions for operations of the base station 100.

(4) Processing Unit 140

The processing unit 140 provides various functions of the base station 100. The processing unit 140 includes a communication processing unit 141, an obtaining unit 143, a determining unit 145, a measurement unit 147, and a configuring unit 149. Note that the processing unit 140 may further include constituent elements other than these constituent elements. In other words, the processing unit 140 may also perform operations other than the operations of these constituent elements. Concrete operations of the communication processing unit 141, the obtaining unit 143, the determining unit 145, the measurement unit 147, and the configuring unit 149 will be described later in detail.

For example, the processing unit 140 (the communication processing unit 141) communicates with a terminal apparatus (e.g., the terminal apparatus 200) via the radio communication unit 110.

(5) Implementation Example

The radio communication unit 110 may be implemented with an antenna, a radio frequency (RF) circuit, and the like, and the antenna may be a directional antenna. The network communication unit 120 may be implemented with a network adapter and/or a network interface card, and the like. The storage unit 130 may be implemented with a memory (e.g., a nonvolatile memory and/or a volatile memory) and/or a hard disk, and the like. The processing unit 140 may be implemented with one or more processors, such as a baseband (BB) processor and/or a different kind of processor. The communication processing unit 141, the obtaining unit 143, the determining unit 145, the measurement unit 147, and the configuring unit 149 may be implemented with the same processor or may be implemented with separate processors. The memory (storage unit 130) may be included in the one or more processors or may be provided outside the one or more processors.

The base station 100 may include a memory configured to store a program (instructions) and one or more processors that can execute the program (instructions). The one or more processors may execute the program and thereby perform operations of the processing unit 140 (operations of the communication processing unit 141, the obtaining unit 143, the determining unit 145, the measurement unit 147, and/or the configuring unit 149). The program may be a program for causing the processor(s) to perform operations of the processing unit 140 (operations of the communication processing unit 141, the obtaining unit 143, the determining unit 145, the measurement unit 147, and/or the configuring unit 149).

Note that the base station 100 may be virtual. In other words, the base station 100 may be implemented as a virtual machine. In this case, the base station 100 (the virtual machine) may operate as a physical machine (hardware) including a processor, a memory, and the like, and a virtual machine on a hypervisor.

<3.2. Configuration of Terminal Apparatus>

Figure 4:
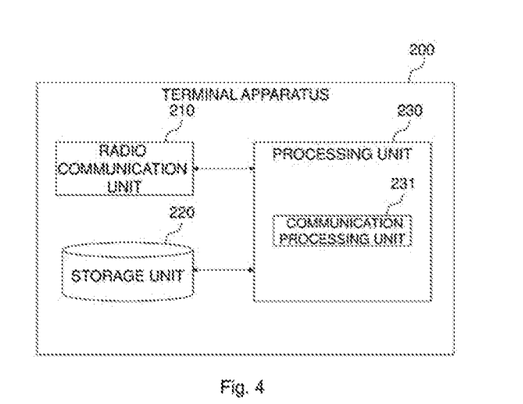
FIG. 4 is a block diagram illustrating an example of a schematic configuration of a terminal apparatus 200 according to the first example embodiment.

Next, with reference to FIG. 4, an example of a configuration of the terminal apparatus 200 of the first example embodiment will be described. FIG. 4 is a block diagram illustrating an example of a schematic configuration of the terminal apparatus 200 of the first example embodiment. With reference to FIG. 4, the terminal apparatus 200 includes a radio communication unit 210, a storage unit 220, and a processing unit 230.

(1) Radio Communication Unit 210

The radio communication unit 210 wirelessly transmits and/or receives a signal. For example, the radio communication unit 210 receives a signal from a base station and transmits a signal to the base station.

(2) Storage Unit 220

The storage unit 220 temporarily or permanently stores programs and parameters for operations of the terminal apparatus 200 as well as various data.

(3) Processing Unit 230

The processing unit 230 provides various functions of the terminal apparatus 200. The processing unit 230 includes a communication processing unit 231. Note that the processing unit 230 may further include constituent elements other than these constituent elements. In other words, the processing unit 230 may also perform operations other than the operations of these constituent elements. Concrete operations of the communication processing unit 231 will be described later in detail.

For example, the processing unit 230 (for example, the communication processing unit 231) communicates with a base station (e.g., the base station 100) via the radio communication unit 210.

(4) Implementation Example

The radio communication unit 210 may be implemented with an antenna, a radio frequency (RF) circuit, and the like. The storage unit 220 may be implemented with a memory (e.g., a nonvolatile memory and/or a volatile memory) and/or a hard disk, and the like. The processing unit 230 may be implemented with a baseband (BB) processor and/or a different kind of processor, or the like. The memory (the storage unit 220) may be included in such a processor (a chip) or may be provided outside the one or more processors. As an example, the processing unit 230 may be implemented in a system on chip (SoC).

The terminal apparatus 200 may include a memory configured to store a program (instructions) and one or more processors that can execute the program (instructions). The one or more processors may execute the program and thereby perform operations of the processing unit 230 (operations of the communication processing unit 231). The program may be a program for causing the processor(s) to perform operations of the processing unit 230 (operations of the communication processing unit 231).

<3.3. Technical Features>

Next, technical features of the first example embodiment will be described with reference to FIGS. 5 to 9.

In the first example embodiment, the base station 100 (the obtaining unit 143) obtains information related to a maximum communication bandwidth for the terminal apparatus 200 and information related to one or more bandwidth parts configured for the terminal apparatus 200. The base station 100 (the determining unit 145) then determines a communication band used by the terminal apparatus 200, based on the information related to the maximum communication bandwidth for the terminal apparatus 200 and the information related to the one or more bandwidth parts configured for the terminal apparatus 200.

The base station 100 (the communication processing unit 141) also notifies, to the terminal apparatus 200, information related to the communication band used by the terminal apparatus 200. In contrast, the terminal apparatus 200 (the communication processing unit 231) communicates with the base station 100 by using the information related to the communication band notified from the base station 100.

(1) Bandwidth Parts

For example, each of the bandwidth parts has a bandwidth of two or more resource blocks in a system band (or a component carrier) of a cellular system (or a mobile communication system). In other words, the bandwidth part includes two or more contiguous resource blocks.

For example, the base station 100 (the configuring unit 149) configures one or more bandwidth parts for the terminal apparatus 200 within the system band (or the component carrier) in consideration of radio transmission path characteristics between the terminal apparatus 200 and the base station 100, the maximum communication bandwidth for the terminal apparatus 200, and the like.

The one or more bandwidth parts configured for the terminal apparatus 200 is switched to active or inactive by the base station 100, for example. Only when the bandwidth part is active, data is mapped to the resource blocks in the bandwidth part. Specifically, the bandwidth part is switched to active or inactive according to the amount of data communicated between the base station 100 and the terminal apparatus 200, and the like.

(2) Communication Band Used by Terminal Apparatus

The communication band used by the terminal apparatus 200 is, for example, a reception band used by the terminal apparatus 200 or a transmission band used by the terminal apparatus 200. Alternatively, the communication band used by the terminal apparatus 200 corresponds to both a reception band and a transmission band.

(2-1) Determination of Communication Band

The bandwidth of the communication band used by the terminal apparatus 200 is determined based on the maximum communication bandwidth for the terminal apparatus 200 within a range not exceeding the maximum communication bandwidth. The communication band used by the terminal apparatus 200 is determined based on the information related to the bandwidth part(s) configured for the terminal apparatus 200, as in first to third concrete examples below, for example.

First Concrete Example

For example, as a first concrete example, the communication band used by the terminal apparatus 200 may include all bandwidth parts configured for the terminal apparatus 200.

Figure 5:
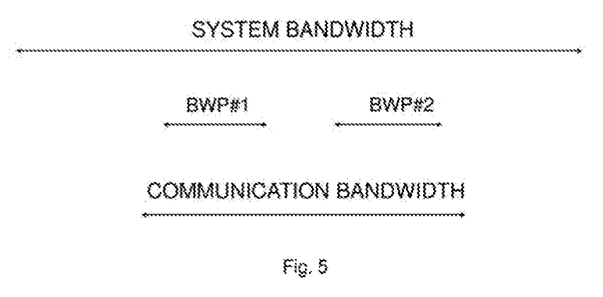
FIG. 5 is an explanatory diagram for illustrating an example of a communication band according to a first concrete example.

FIG. 5 is an explanatory diagram for illustrating an example of a communication band according to the first concrete example. Specifically, FIG. 5 illustrates an example of a case where two bandwidth parts BWP #1 and BWP #2 are configured for the terminal apparatus 200. In this case, the base station 100 (the determining unit 145) determines the communication band used by the terminal apparatus 200, to include all the bandwidth parts BWP #1 and BWP #2.

By thus determining the communication band, it is possible, for example, even when the bandwidth part BWP #1 or the bandwidth part BWP #2 as that illustrated in FIG. 5 is switched to active, to perform communication using the bandwidth parts BWP #1 and BWP #2 without switching the communication band for the terminal apparatus 200.

Second Concrete Example

For example, as a second concrete example, the communication band used by the terminal apparatus 200 may include all active bandwidth part(s) among one or more bandwidth parts configured for the terminal apparatus 200.

Figure 6:
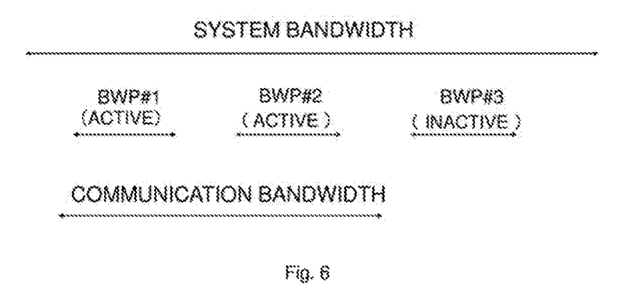
FIG. 6 is an explanatory diagram for illustrating an example of a communication band according to a second concrete example.

FIG. 6 is an explanatory diagram for illustrating an example of a communication band according to the second concrete example. Specifically, FIG. 6 illustrates an example of a case where three bandwidth parts BWP #1, BWP #2, and BWP #3 aligned in the frequency direction are configured for the terminal apparatus 200. Here, the two bandwidth parts BWP #1 and BWP #2 are active, while the one bandwidth part BWP #3 is inactive.

In the example illustrated in FIG. 6, the base station 100 (the determining unit 145) determines the communication band used by the terminal apparatus 200, to include all the active bandwidth parts BWP #1 and BWP #2 among the configured bandwidth parts BWP #1, BWP #2, and BWP #3.

By thus determining the communication band, switching of the communication band for the terminal apparatus 200 occurs only when the bandwidth part BWP #3 is switched from inactive to active. Hence, it is possible to suppress the frequency of switching of the communication band for the terminal apparatus 200.

Third Concrete Example

For example, as a third concrete example, the communication band used by the terminal apparatus 200 may include all active bandwidth parts and one or more inactive bandwidth parts among the one or more bandwidth parts configured for the terminal apparatus 200.

Figure 7:
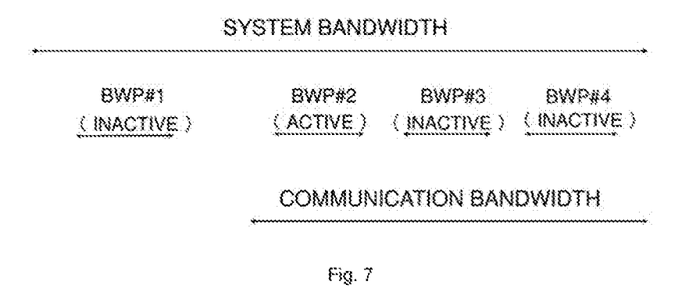
FIG. 7 is an explanatory diagram for illustrating an example of a communication band according to a third concrete example.

FIG. 7 is an explanatory diagram for illustrating an example of a communication band according to the third concrete example. Specifically, FIG. 7 illustrates an example of a case where four bandwidth parts BWP #1, BWP #2, BWP #3, and BWP #4 aligned in the frequency direction are configured for the terminal apparatus 200. Here, the one bandwidth part BWP #2 is active, while the other three bandwidth parts BWP #1, BWP #3, and BWP #4 are inactive.

In this case, the base station 100 (the determining unit 145) determines the communication band used by the terminal apparatus 200, to include at least one of the inactive bandwidth parts BWP #1, BWP #3, and BWP #4 in addition to all the active bandwidth part BWP #1 among the configured bandwidth parts BWP #1, BWP #2, BWP #3, and BWP #4.

In particular, the base station 100 (the determining unit 145) preferably determines the communication band used by the terminal apparatus 200, to include all the active bandwidth parts and the maximum number of inactive bandwidth parts among the one or more bandwidth parts configured for the terminal apparatus 200.

For example, in the example illustrated in FIG. 7, a gap between the bandwidth part BWP #2 and the bandwidth part BWP #3 and a gap between the bandwidth part BWP #3 and the bandwidth part BWP #4 are shorter than a gap between the bandwidth part BWP #1 and the bandwidth part BWP #2. Hence, the communication band can include the total of three bandwidth parts BWP #2, BWP #3, and BWP #4 as illustrated in FIG. 7. In other words, the base station 100 (the determining unit 145) determining the communication band used by the terminal apparatus 200, to include the bandwidth parts BWP #2, BWP #3, and BWP #4, allows more inactive bandwidth parts to be included.

By thus determining the communication band as illustrated in FIG. 7, switching of the communication band for the terminal apparatus 200 occurs only when the bandwidth part BWP #1 among the inactive bandwidth parts BWP #1, BWP #3, and BWP #4 is switched to active. Hence, it is possible to suppress the frequency of switching of the communication band for the terminal apparatus 200.

(2-2) Measurement Based on Communication Band

For example, the base station 100 (the measurement unit 147) may measures radio transmission path characteristics between the terminal apparatus 200 and the base station 100, within the communication band used by the terminal apparatus 200. Concretely, the base station 100 (the measurement unit 147) may measure radio transmission path characteristics with reference to an uplink reference signal transmitted from the terminal apparatus 200 within the communication band, for example. Then, based on a result of the measurement, the base station 100 (the configuring unit 149) may update the configuration of the bandwidth part(s) with a priority given to the bandwidth(s) included in the communication band in the system band.

As described above, for example, by giving a priority to measurement within the communication band at the time of updating the configuration of the bandwidth part(s), it is possible to suppress frequency of switching of the communication band for the terminal apparatus 200.

(2-3) Plurality of Candidate Communication Bands

For example, the communication band used by the terminal apparatus 200 may be determined from among candidate communication bands the number of which is equal to or smaller than a predetermined number. Specifically, the base station 100 (the determining unit 145) may determine a communication band used by the terminal apparatus 200 from among a plurality of candidate communication bands, based on the information related to the maximum communication bandwidth for the terminal apparatus 200 and the information related to the one or more bandwidth parts configured for the terminal apparatus 200.

In this case, the information related to the communication band used by the terminal apparatus 200 may be information related to a candidate corresponding to the communication band used by the terminal apparatus 200 among the plurality of candidate communication bands. In other words, the base station 100 (the communication processing unit 141) may notify, to the terminal apparatus 200, information related to the candidate corresponding to the communication band used by the terminal apparatus 200.

Figure 8:
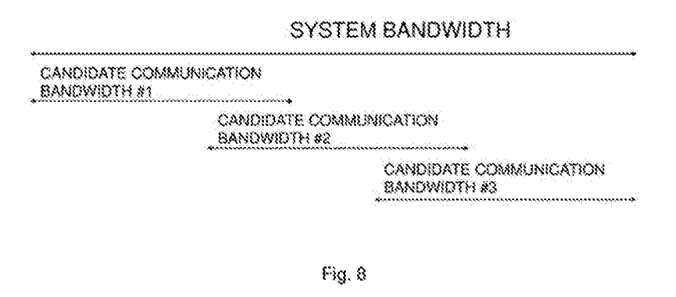
FIG. 8 is an explanatory diagram for illustrating an example of a plurality of candidate communication bands.

FIG. 8 is an explanatory diagram for illustrating an example of a plurality of candidate communication bands. In the example illustrated in FIG. 8, three candidate communication bands (candidate communication bands #1, #2, and #3) are configured within a system band. In the example illustrated in FIG. 8, the communication band used by the terminal apparatus 200 is determined from among the candidate communication bands #1, #2, and #3. Information indicating the determined candidate communication band is then notified from the base station 100 to the terminal apparatus 200.

By thus determining the communication band used by the terminal apparatus 200 from among the three candidate communication bands #1, #2, and #3, information related to the communication band notified from the base station 100 to the terminal apparatus 200 can be expressed by 2-bit information. In other words, it is possible to suppress overhead of control information for notifying the information related to the communication band used by the terminal apparatus 200.

Note that information related to a plurality of candidate communication bands may be included in control information notified from the base station 100 to the terminal apparatus 200 before determination of the communication band. With this, it is possible for the base station 100 and the terminal apparatus 200 to have common understanding about the type of communication band of each candidate.

Configuration of Bandwidth Part(s), Based on Plurality of Candidate Communication Bands For example, the one or more bandwidth parts may be configured in the same candidate communication band among the plurality of candidate communication bands. In other words, the base station 100 (the configuring unit 149) may configure all bandwidth parts used by the terminal apparatus 200 within one candidate communication band.

Figure 9:
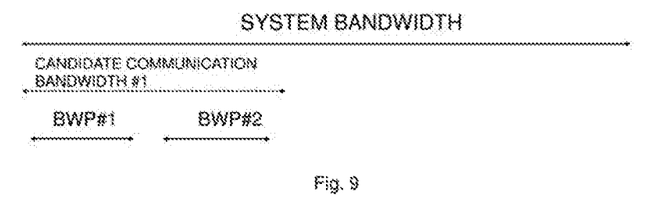
FIG. 9 is an explanatory diagram for illustrating an example of bandwidth parts configured in the same candidate communication band.

FIG. 9 is an explanatory diagram for illustrating an example of bandwidth parts configured in the same candidate communication band. In the example illustrated in FIG. 9, all the bandwidth parts BWP #1 and BWP #2 are configured within the candidate communication band #1. In other words, the base station 100 (the configuring unit 149) configures all the bandwidth parts BWP #1 and BWP #2 within the candidate communication band #1. The base station 100 (the determining unit 145) only needs to determine the candidate communication band #1 as the communication band used by the terminal apparatus 200, with reference to the above-described configuration of the bandwidth parts BWP #1 and BWP #2.

By thus configuring all the bandwidth parts used by the terminal apparatus 200 within the same communication band, it is possible, for example, even when the bandwidth part BWP #1 or BWP #2 is switched to active as illustrated in FIG. 9, to perform communication using the bandwidth parts BWP #1 and BWP #2 without switching the communication band for the terminal apparatus 200.

<3.4. Example Alteration>

Various alterations are possible in the first example embodiment without being limited to the above-described configurations. For example, determination of the communication band used by the terminal apparatus 200 may be performed by the terminal apparatus 200. The information related to the communication band used by the terminal apparatus 200 may be notified from the terminal apparatus 200 to the base station 100.

(1) Configuration of Base Station 100

Figure 10:
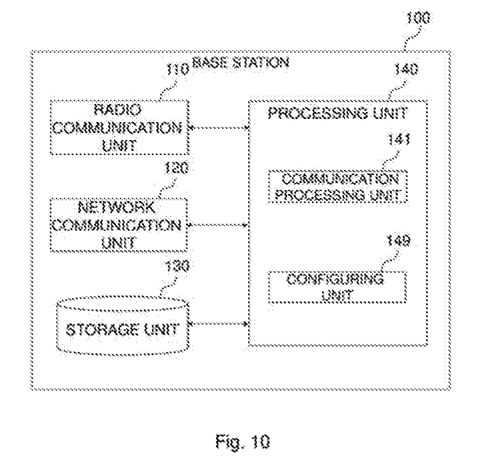
FIG. 10 is a block diagram illustrating an example of a schematic configuration of a base station 100 according to an example alteration.

FIG. 10 is a block diagram illustrating an example of a schematic configuration of the base station 100 according to an example alteration. As illustrated in FIG. 10, the base station 100 includes the radio communication unit 110, the network communication unit 120, the storage unit 130, and the processing unit 140. The processing unit 140 includes the communication processing unit 141 and the configuring unit 149. Note that the processing unit 140 may further include constituent elements other than these constituent elements.

(2) Configuration of Terminal Apparatus 200

Figure 11:
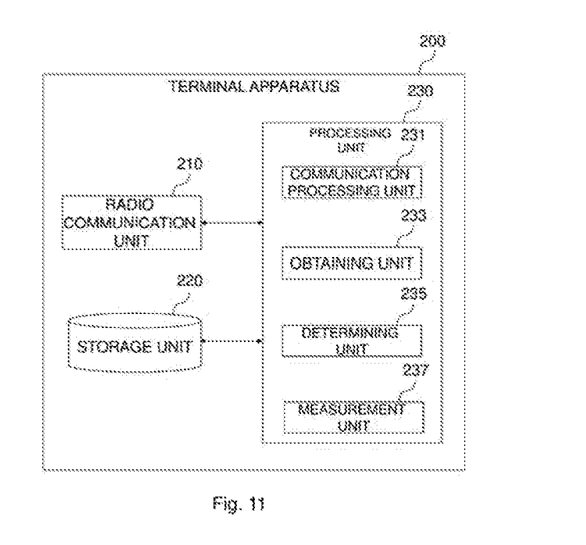
FIG. 11 is a block diagram illustrating an example of a schematic configuration of a terminal apparatus 200 according to the example alteration.

FIG. 11 is a block diagram illustrating an example of a schematic configuration of a terminal apparatus 200 according to the example alteration. As illustrated in FIG. 11, the terminal apparatus 200 includes the radio communication unit 210, the storage unit 220, and the processing unit 230. The processing unit 230 includes the communication processing unit 231, the obtaining unit 233, the determining unit 235, and the measurement unit 237. Note that the processing unit 230 may further include constituent elements other than these constituent elements.

(3) Technical Features

Next, technical features of the example alteration will be described.

In the example alteration, the terminal apparatus 200 (the obtaining unit 233) obtains information related to a maximum communication bandwidth for the terminal apparatus 200 and information related to one or more bandwidth parts configured for the terminal apparatus 200. The terminal apparatus 200 (the determining unit 235) then determines a communication band used by the terminal apparatus 200, based on the information related to the maximum communication bandwidth for the terminal apparatus 200 and the information related to the one or more bandwidth parts configured for the terminal apparatus 200.

The terminal apparatus 200 (the communication processing unit 231) also notifies, to the base station 100, information related to the communication band used by the terminal apparatus 200. In contrast, the base station 100 (the configuring unit 149) updates a configuration of bandwidth part(s) used by the terminal apparatus 200, based on the information related to the communication band notified from the terminal apparatus 200.

Determination of Communication Band

The bandwidth of the communication band used by the terminal apparatus 200 is determined based on the maximum communication bandwidth for the terminal apparatus 200 within a range not exceeding the maximum communication bandwidth. The communication band used by the terminal apparatus 200 is determined based on the information related to the bandwidth part configured for the terminal apparatus 200, as follows, for example.

For example, the communication band used by the terminal apparatus 200 may include all bandwidth parts configured for the terminal apparatus 200.

As another example, the communication band used by the terminal apparatus 200 may include all active bandwidth part(s) among one or more bandwidth parts configured for the terminal apparatus 200.

As a still another example, the communication band used by the terminal apparatus 200 may include all active bandwidth part(s) and one or more inactive bandwidth parts among the one or more bandwidth parts configured for the terminal apparatus 200. In particular, the terminal apparatus 200 (the determining unit 235) may determine the communication band used by the terminal apparatus 200, to include all active bandwidth parts and the maximum number of inactive bandwidth parts among the one or more bandwidth parts configured for the terminal apparatus 200.

Measurement Based on Communication Band

For example, the terminal apparatus 200 (measurement unit 237) may perform measurement of radio transmission path characteristics between the terminal apparatus 200 and the base station 100, within the communication band used by the terminal apparatus 200.

For example, for update of a configuration of a bandwidth part(s), the terminal apparatus 200 (the measurement unit 237) performs, in response to request of measurement of radio transmission path characteristics from the base station 100, measurement of radio transmission path characteristics within the determined communication band with a higher priority than that for other band within the system band. Concretely, the terminal apparatus 200 (the measurement unit 237) measures radio transmission path characteristics with reference to a downlink reference signal transmitted from the base station 100 within the communication band, for example.

By notifying a result of the measurement from the terminal apparatus 200 to the base station 100, a bandwidth part(s) within the communication band can be configured with a higher priority. Consequently, it is possible to suppress the frequency of switching of the communication band for the terminal apparatus 200.

Plurality of Candidate Communication Bands

For example, the communication band used by the terminal apparatus 200 may be determined from among candidate communication bands the number of which is equal to or smaller than a predetermined number. Specifically, the terminal apparatus 200 (determining unit 235) may determine a communication band used by the terminal apparatus 200 from among a plurality of candidate communication bands, based on the information related to the maximum communication bandwidth for the terminal apparatus 200 and the information related to the one or more bandwidth parts configured for the terminal apparatus 200.

4. Second Example Embodiment

Next, a description will be given of a second example embodiment of the present invention with reference to FIG. 12. The above-described first example embodiment is a concrete example embodiment, whereas the second example embodiment is a more generalized example embodiment.

<4.1. Configuration of Radio Communication Apparatus>

Figure 12:
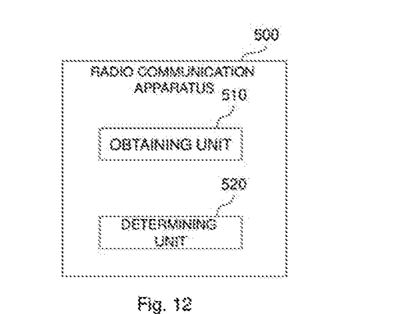
FIG. 12 is a block diagram illustrating an example of a schematic configuration of a radio communication apparatus 500 according to a second example embodiment.

With reference to FIG. 12, an example of a configuration of a radio communication apparatus 500 according to the second example embodiment will be described. FIG. 12 is a block diagram illustrating an example of a schematic configuration of the radio communication apparatus 500 according to the second example embodiment. With reference to FIG. 12, the radio communication apparatus 500 includes an obtaining unit 510 and a determining unit 520. Concrete operations of the obtaining unit 510 and the determining unit 520 will be described later in detail.

The obtaining unit 510 and the determining unit 520 may be implemented with one or more processors (such as a BB processor and/or a different kind of processor) and a memory. The memory may be included in the one or more processors or may be provided outside the one or more processors.

The obtaining unit 510 and the determining unit 520 may include a memory configured to store a program (instructions) and one or more processors that can execute the program (instructions). The one or more processors may execute the program and thereby perform operations of the obtaining unit 510 and the determining unit 520. The program may be a program for causing the processor(s) to execute the operations of the obtaining unit 510 and the determining unit 520.

Note that the radio communication apparatus 500 may, of course, further include constituent elements other than the obtaining unit 510 and the determining unit 520. For example, the radio communication apparatus 500, as in the first example embodiment, may further include the radio communication unit 110, the network communication unit 120, and/or the storage unit 130, and/or may further include other constituent elements.

<4.2. Technical Features>

Technical features of the second example embodiment will be described.

In the second example embodiment, the radio communication apparatus 500 (the obtaining unit 510) obtains information related to a maximum communication bandwidth for a terminal apparatus and information related to one or more bandwidth parts configured for the terminal apparatus. The radio communication apparatus 500 (the determining unit 520) then determines a communication band used by the terminal apparatus, based on the information related to the maximum communication bandwidth for the terminal apparatus and the information related to the one or more bandwidth parts configured for the terminal apparatus.

With this, it is possible, for example, to flexibly determine a communication band in consideration of a bandwidth part(s) configured for the terminal apparatus.

As an example, descriptions of a bandwidth part(s) and/or a communication band used by the terminal apparatus may be the same as those in the first example embodiment. Hence, overlapping descriptions are omitted here. Note that, in this case, the obtaining unit 510 may operate similarly to the obtaining unit 143 or the obtaining unit 233 of the first example embodiment, and the determining unit 520 may operate similarly to the determining unit 145 or the determining unit 235 of the first example embodiment.

The second example embodiment is, of course, not limited to this example.

5. Other Example Aspects

Descriptions have been given above of the example embodiments of the present invention. However, the present invention is not limited to these example embodiments. It should be understood by those of ordinary skill in the art that these example embodiments are merely examples and that various alterations are possible without departing from the scope and the spirit of the present invention.

An apparatus including constituent elements (e.g., the communication processing unit, the obtaining unit, the determining unit, the measurement unit, and/or the configuring unit) of the base station described in the Specification (e.g., one or more apparatuses (or units) among a plurality of apparatuses (or units) constituting the base station or a module for one of the plurality of apparatuses (or units)) may be provided. An apparatus including the constituent elements (e.g., the communication processing unit, the obtaining unit, the determining unit, and/or the measurement unit) of the terminal apparatus described in the Specification (e.g., a module for the terminal apparatus) may be provided. Moreover, methods including processing of the constituent elements may be provided, and programs for causing a processor to execute processing of the constituent elements may be provided. Moreover, non-transitory computer-readable recording media (non-transitory computer readable media) having recorded thereon the programs may be provided. It is apparent that such apparatuses, modules, methods, programs, and non-transitory computer-readable recording media are also included in the present invention.

The whole or part of the example embodiments disclosed above can be described as, but not limited to, the following supplementary notes.

(Supplementary Note 1)

A radio communication apparatus comprising:

an obtaining unit configured to obtain information related to a maximum communication band for a terminal apparatus and information related to one or more bandwidth parts configured for the terminal apparatus; and a determining unit configured to determine a communication band used by the terminal apparatus, based on the information related to the maximum communication bandwidth for the terminal apparatus and the information related to the one or more bandwidth parts configured for the terminal apparatus.

(Supplementary Note 2)

The radio communication apparatus according to Supplementary Note 1, wherein the radio communication apparatus is a base station which performs radio communication with the terminal apparatus.

(Supplementary Note 3)

The radio communication apparatus according to Supplementary Note 2, further comprising a communication processing unit configured to notify, to the terminal apparatus, information related to the communication band used by the terminal apparatus.

(Supplementary Note 4)

The radio communication apparatus according to Supplementary Note 1, wherein the radio communication apparatus is the terminal apparatus.

(Supplementary Note 5)

The radio communication apparatus according to Supplementary Note 4, further comprising a communication processing unit configured to notify, to a base station which performs radio communication with the terminal apparatus, information related to the communication band used by the terminal apparatus.

(Supplementary Note 6)

The radio communication apparatus according to Supplementary Note 3 or 5, wherein the determining unit is configured to determine the communication band used by the terminal apparatus among a plurality of candidate communication bands, based on the information related to the maximum communication bandwidth for the terminal apparatus and the information related to the one or more bandwidth parts configured for the terminal apparatus, and the information related to the communication band used by the terminal apparatus is information related to a candidate corresponding to the communication band used by the terminal apparatus among the plurality of candidate communication bands.

(Supplementary Note 7)

The radio communication apparatus according to Supplementary Note 6, wherein the one or more bandwidth parts are configured in the same candidate communication band among the plurality of candidate communication bands.

(Supplementary Note 8)

The radio communication apparatus according to any one of Supplementary Notes 1 to 7, wherein the communication band used by the terminal apparatus includes all bandwidth parts configured for the terminal apparatus.

(Supplementary Note 9)

The radio communication apparatus according to any one of Supplementary Notes 1 to 7, wherein the communication band used by the terminal apparatus includes all active bandwidth parts among the one or more bandwidth parts configured for the terminal apparatus.

(Supplementary Note 10)

The radio communication apparatus according to any one of Supplementary Notes 1 to 7, wherein the communication band used by the terminal apparatus includes all active bandwidth parts and one or more inactive bandwidth parts among the one or more bandwidth parts configured for the terminal apparatus.

(Supplementary Note 11)

The radio communication apparatus according to Supplementary Note 10, wherein the determining unit is configured to determine the communication band used by the terminal apparatus to include all active bandwidth parts and a maximum number of inactive bandwidth parts among the one or more bandwidth parts configured for the terminal apparatus.

(Supplementary Note 12)

The radio communication apparatus according to any one of Supplementary Notes 1 to 11, further comprising a measurement unit configured to perform measurement of a radio transmission path characteristic between the terminal apparatus and a base station, within the communication band used by the terminal apparatus.

(Supplementary Note 13)

A method comprising:
  obtaining information related to a maximum communication bandwidth for a terminal apparatus and information related to one or more bandwidth parts configured for the terminal apparatus; and
  determining a communication band used by the terminal apparatus, based on the information related to the maximum communication bandwidth for the terminal apparatus and the information related to the one or more bandwidth parts configured for the terminal apparatus.

(Supplementary Note 14)

A program that causes a processor to:
  obtain information related to a maximum communication bandwidth for a terminal apparatus and information related to one or more bandwidth parts configured for the terminal apparatus; and
  determine a communication band used by the terminal apparatus, based on the information related to the maximum communication bandwidth for the terminal apparatus and the information related to the one or more bandwidth parts configured for the terminal apparatus.

(Supplementary Note 15)

A readable non-transitory recording medium having recorded thereon a program that causes a processor to:
  obtain information related to a maximum communication bandwidth for a terminal apparatus and information related to one or more bandwidth parts configured for the terminal apparatus; and
  determine a communication band used by the terminal apparatus, based on the information related to the maximum communication bandwidth for the terminal apparatus and the information related to the one or more bandwidth parts configured for the terminal apparatus.

It is possible to flexibly determine a communication band in consideration of a bandwidth part configured for a terminal apparatus, in a mobile communication system.

REFERENCE SIGNS LIST

1 System
100 Base Station
141, 231 Communication Processing Unit
143, 233, 510 Obtaining Unit
145, 235, 520 Determining Unit
147, 237 Measurement Unit
149 Configuring Unit
200 Terminal Apparatus
500 Radio Communication Apparatus

What is claimed is:

1. A radio communication apparatus comprising:
a memory storing instructions; and
one or more processors configured to execute the instructions to:
  obtain information related to a maximum communication bandwidth for a terminal apparatus and information related to bandwidth parts configured for the terminal apparatus; and
  notify a communication band used by the terminal apparatus,
wherein:
  the communication band includes all active bandwidth parts and a maximum number of inactive bandwidth parts among the bandwidth parts configured for the terminal apparatus,
  a bandwidth of the communication band is less than or equal to the maximum communication bandwidth for the terminal apparatus,
  at least one inactive bandwidth part included in the communication band is determined based on the total frequency bandwidth comprising the all active bandwidth parts and at least one inactive bandwidth part within a system band,
  the all active bandwidth parts include two or more bandwidth parts, and
  the at least one inactive bandwidth part included in the communication band is determined based on a gap between one active bandwidth part included in the communication band and one inactive bandwidth part next to the one active bandwidth part being shorter than a gap between the one active bandwidth part and another inactive bandwidth part not included in the communication band, and
wherein the one inactive bandwidth part is included in the communication band.

2. The radio communication apparatus according to claim 1, wherein the radio communication apparatus is a base station configured to perform radio communication with the terminal apparatus.

3. The radio communication apparatus according to claim 2, wherein the communication band is a candidate, corresponding to the communication band used by the terminal apparatus, selected from a plurality of candidates.

4. The radio communication apparatus according to claim 3, wherein the candidate is the communication band including all bandwidth parts configured for the terminal apparatus.

5. The radio communication apparatus according to claim 1, wherein the radio communication apparatus is the terminal apparatus.

6. The radio communication apparatus according to claim 1, wherein the one or more processors are configured to execute the instructions to perform measurement of a radio transmission path characteristic between the terminal apparatus and a base station, within the communication band used by the terminal apparatus and with a higher priority than that for another band within the system band, in response to a request of the measurement of the radio transmission path characteristic.

7. A method comprising:
obtaining information related to a maximum communication bandwidth for a terminal apparatus and information related to bandwidth parts configured for the terminal apparatus; and
notifying a communication band used by the terminal apparatus,
wherein:
    the communication band includes all active bandwidth parts and a maximum number of inactive bandwidth parts among the bandwidth parts configured for the terminal apparatus,
    a bandwidth of the communication band is less than or equal to the maximum communication bandwidth for the terminal apparatus,
    at least one inactive bandwidth part included in the communication band is determined based on the total frequency bandwidth comprising the all active bandwidth parts and at least one inactive bandwidth part within a system band,
    the all active bandwidth parts include two or more bandwidth parts, and
    the at least one inactive bandwidth part included in the communication band is determined based on a gap between one active bandwidth part included in the communication band and one inactive bandwidth part next to the one active bandwidth part being shorter than a gap between the one active bandwidth part and another inactive bandwidth part not included in the communication band, and
wherein the one inactive bandwidth part is included in the communication band.

8. A readable non-transitory recording medium having recorded thereon a program that, when executed, causes a processor to execute operations comprising:
obtaining information related to a maximum communication bandwidth for a terminal apparatus and information related to one or more bandwidth parts configured for the terminal apparatus; and
notifying a communication band used by the terminal apparatus,
wherein:
    the communication band includes all active bandwidth parts and a maximum number of inactive bandwidth parts among the bandwidth parts configured for the terminal apparatus,
    a bandwidth of the communication band is less than or equal to the maximum communication bandwidth for the terminal apparatus,
    at least one inactive bandwidth part included in the communication band is determined based on the total frequency bandwidth comprising the all active bandwidth parts and at least one inactive bandwidth part within a system band,
    the all active bandwidth parts include two or more bandwidth parts, and
    the at least one inactive bandwidth part included in the communication band is determined based on a gap between one active bandwidth part included in the communication band and one inactive bandwidth part next to the one active bandwidth part being shorter than a gap between the one active bandwidth part and another inactive bandwidth part not included in the communication band,
wherein the one inactive bandwidth part is included in the communication band.

\* \* \* \* \*